(12) United States Patent
    Lara

(10) Patent No.: US 11,856,045 B2
(45) Date of Patent: Dec. 26, 2023

(54) COMPUTING AND COMMUNICATION SYSTEMS AND METHODS

(71) Applicant: Breezeway Logic LLC, Shelton, CT (US)

(72) Inventor: Brian Robert Lara, Charlotte, NC (US)

(73) Assignee: Breezeway Logic LLC, Charlotte, NC (US)

(*) Notice: Subject to any disclaimer, the term of this patent is extended or adjusted under 35 U.S.C. 154(b) by 354 days.

(21) Appl. No.: 16/948,193

(22) Filed: Sep. 8, 2020

(65) Prior Publication Data
    US 2021/0112113 A1    Apr. 15, 2021

Related U.S. Application Data

(60) Provisional application No. 62/980,418, filed on Feb. 23, 2020, provisional application No. 62/914,440, filed on Oct. 12, 2019.

(51) Int. Cl.
    *H04L 67/02*    (2022.01)
    *H04W 12/06*    (2021.01)
    (Continued)

(52) U.S. Cl.
    CPC ............ *H04L 67/02* (2013.01); *H04L 67/04* (2013.01); *H04M 3/54* (2013.01); *H04W 12/06* (2013.01)

(58) Field of Classification Search
    CPC .... G06F 16/27; G06F 16/1787; G06F 16/176; G06F 16/1824; H04L 67/02; H04L 67/04; H04M 3/54; H04W 12/06
    See application file for complete search history.

(56) References Cited

U.S. PATENT DOCUMENTS

| | | | |
|---|---|---|---|
| 2008/0168245 A1 | 7/2008 | De Atley et al. | |
| 2009/0157513 A1* | 6/2009 | Bonev | G06Q 30/0273 707/999.005 |
| 2009/0313320 A1* | 12/2009 | Parsons | H04L 61/4511 709/203 |

(Continued)

OTHER PUBLICATIONS

Written Opinion of the International Searching Authority for PCT/US2020/070629, which PCT application is a child application of the instant application.

*Primary Examiner* — Mehmood B. Khan
(74) *Attorney, Agent, or Firm* — Law Office of Paul B. Johnson; Paul B. Johnson

(57) ABSTRACT

Computing and communication systems and methods include one or more servers communicatively coupled with a computing device through a telecommunications network. In implementations one or more data stores are communicatively coupled with the server(s). One or more user interfaces displayed on the computing device display a website provided by the server(s) and accessed using a browser. A file selector is displayed on the website. The file selector corresponds with a file that may already reside on the computing device and/or on a file share accessible by the computing device. The file selector is configured to initiate opening of the file locally on the computing device without necessarily downloading a copy of the file through the browser. The systems and methods may automatically initiate calls and/or texts on non-cell phones (e.g., desk phones, turret type phones and/or VOIP phones) in response to selection of a phone number displayed on a website.

20 Claims, 7 Drawing Sheets

(51) Int. Cl.
*H04M 3/54* (2006.01)
*H04L 67/04* (2022.01)

(56) References Cited

U.S. PATENT DOCUMENTS

| | | | | |
|---|---|---|---|---|
| 2009/0313321 | A1* | 12/2009 | Parsons | H04L 41/0253 709/203 |
| 2010/0125816 | A1* | 5/2010 | Bezos | G06F 3/017 715/863 |
| 2012/0002795 | A1 | 1/2012 | Berk | |
| 2013/0073395 | A1 | 3/2013 | Rincon et al. | |
| 2013/0124638 | A1* | 5/2013 | Barreto | H04L 65/403 709/205 |
| 2013/0138608 | A1* | 5/2013 | Smith | G06F 16/27 707/610 |
| 2013/0179947 | A1* | 7/2013 | Kline, III | H04L 63/0892 726/4 |
| 2013/0304694 | A1* | 11/2013 | Barreto | G06F 16/27 707/608 |
| 2014/0013342 | A1* | 1/2014 | Swan | H04N 21/4821 725/92 |
| 2014/0149461 | A1 | 5/2014 | Wijayaratne et al. | |
| 2014/0164905 | A1* | 6/2014 | Bruce | G06F 16/9577 715/234 |
| 2014/0164906 | A1* | 6/2014 | Hassler | G06F 16/9577 715/234 |
| 2015/0073837 | A1* | 3/2015 | Griffin, Jr. | G06Q 40/08 705/4 |
| 2017/0061369 | A1* | 3/2017 | Ramamoorthy | G06Q 10/0833 |
| 2017/0123649 | A1* | 5/2017 | Clavel | G06F 3/0485 |
| 2017/0372375 | A1* | 12/2017 | Wi | |
| 2020/0201818 | A1* | 6/2020 | Khajuria | G06F 16/176 |

* cited by examiner

COMPUTING AND COMMUNICATION SYSTEMS AND METHODS

CROSS REFERENCE TO RELATED APPLICATIONS

This document claims the benefit of the filing date of U.S. Provisional Patent Application No. 62/914,440, entitled "Breezeway Link," naming as first inventor Brian Robert Lara, which was filed on Oct. 12, 2019, and further claims the benefit of the filing date of U.S. Provisional Patent Application No. 62/980,418, entitled "Breezeway Link v2," naming as first inventor Brian Robert Lara, which was filed on Feb. 23, 2020, the disclosures of each of which are hereby incorporated entirely herein by reference.

BACKGROUND

1. Technical Field

Aspects of this document relate generally to systems and methods for opening, finding, and preparing files and folders in computing systems by clicking in an area on a browser. Aspects of this document relate generally to systems and methods for initiating a phone communication by clicking in an area on a browser.

2. Background Art

Users often navigate to a website using an internet browser. Some websites have links to documents which the user may wish to open. In prior art implementations, when the user clicks on such a link, the document is downloaded locally from a remote server onto the computing device of the end user.

Some websites have telephone numbers displayed thereon. Prior art methods and systems allow for a user to click on a telephone number within a browser to execute a phone call using a cell phone, and prior art methods exist for allowing a user to click on a telephone number within a browser to initiate a call using a software VOIP, such as SKYPE or the like. There exists a need, however, for a method to enable a user to select a phone number within a browser to initiate a call using a separate, standalone phone (such as a desk phone or VOIP phone) that is not a cellular phone.

SUMMARY

Implementations of computing and communication systems may include: one or more servers communicatively coupled with a computing device through a telecommunications network; one or more user interfaces displayed on a display of the computing device, the one or more user interfaces displaying: an Internet website provided by the one or more servers and accessed using an Internet browser; and a file selector displayed on the Internet website; wherein the file selector corresponds with a file that is already residing or may reside on the computing device and/or already residing or may reside on a file share accessible by the computing device; wherein the file selector is configured to, in response to being selected, initiate opening of the file locally on the computing device without necessarily downloading a copy of the file to the computing device; and wherein the opening of the file is facilitated at least in part by a local software application running on the computing device.

Implementations of computing and communication systems may include one or more or all of the following:

A file path selector may be displayed on the Internet website, the file path selector configured to facilitate a user selection of a location of the file.

A folder path selector may be displayed on the Internet website, the folder path selector configured to facilitate a user selection of a location of a folder.

A folder selector may be displayed on the Internet website, the folder selector may correspond with a folder already residing on the computing device and/or the file share, and the folder selector may be configured to, in response to being selected, initiate opening of the folder locally on the computing device without necessarily downloading a copy of the folder's contents to the computing device. The opening of the folder may be facilitated at least in part by the local software application.

The one or more servers may include a web server, and the local software application may open the file in response to one or more communications from the web server.

The one or more user interfaces may display file information displayed on the Internet website, the file information corresponding with the file, the file information including one or more of: a file type, a file size, a file location, a file creation date, a file creation time, a last edited date, a last edited time, a last accessed date, and a last accessed time, and/or excerpts or key words from the file.

The one or more user interfaces may include an authentication interface configured to authenticate a user.

Implementations of computing and communication methods may include: providing one or more servers communicatively coupled with a computing device through a telecommunications network; displaying one or more user interfaces on a display of the computing device, the one or more user interfaces displaying: an Internet website provided by the one or more servers and accessed using an Internet browser; and a file selector displayed on the Internet website; wherein the file selector corresponds with a file that is already residing or may reside on the computing device and/or already residing or may reside on a file share accessible by the computing device; in response to receiving a user selection of the file selector, initiating opening of the file locally on the computing device without necessarily downloading a copy of the file to the computing device; wherein the opening of the file is facilitated at least in part by a local software application running on the computing device.

Implementations of computing and communication methods may include one or more or all of the following:

A file path selector may be displayed on the Internet website, the file path selector configured to facilitate a user selection of a location of the file.

A folder path selector may be displayed on the Internet website, the folder path selector configured to facilitate a user selection of a location of a folder.

A folder selector may be displayed on the Internet website. The folder selector may correspond with a folder already residing on or that may reside on the computing device and/or the file share. The folder selector may be configured to, in response to being selected, initiate opening of the folder locally on the computing device without necessarily downloading a copy of the folder's contents to the computing device. The opening of the folder may be facilitated at least in part by the local software application.

A link on a web browser may be used to prepare a file's structure along with perhaps a set of file templates; in some implementations these templates may be pre-populated with additional information.

In response to user modification of the folder's contents locally on the computing device, a copy of the folder's contents on at least one of the one or more servers may be automatically modified to match the modifications on the computing device or these files may be automatically uploaded to the server and/or the server notified of their presence for possible further processing.

The one or more servers may include a web server, and the local software application may open the file in response to one or more communications from the web server.

The file may reside on the computing device prior to user selection of the file selector.

File information corresponding with the file may be displayed on the Internet website and may include one or more of: a file type, a file size, a file location, a file creation date, a file creation time, a last edited date, a last edited time, a last accessed date, a last accessed time, and/or excerpts of or key words related to the file.

An authentication interface may be displayed on the one or more user interfaces, the authentication interface configured to authenticate a user.

Implementations of computing and communication methods may include: providing one or more servers communicatively coupled with a computing device through a telecommunications network, the computing device communicatively coupled with a phone through a local area network (LAN), wherein the phone is not a cellular phone and is not configured to communicate through cellular towers; displaying one or more user interfaces on a display of the computing device, the one or more user interfaces displaying: an Internet website provided by the one or more servers and accessed using an Internet browser; and a selectable telephone number displayed on the Internet website; in response to receiving a user selection of the selectable telephone number, automatically initiating a communication using the phone; wherein the initiated communication is facilitated at least in part by a local software application running on the computing device. Depending on the implementation, the identification of a phone number may be performed by web browser add-ins or page-based code or on page generation from the web server itself. Depending on the implementation, the phone number could be linked to words and/or names for which contact information is available in that implementation.

Implementations of computing and communication methods may include one or more or all of the following:

Initiating the communication may include preparing a phone call by automatically entering the selected telephone number on the phone, but not executing the phone call.

Initiating the communication may include preparing a phone call by automatically entering the selected telephone number on the phone and further executing the phone call.

Initiating the communication may include preparing a phone text message by automatically entering the selected telephone number on the phone but not preparing a body of the text message and not sending the text message.

Initiating the communication may include preparing a phone text message by automatically entering the selected telephone number on the phone and preparing a body of the text message but not sending the text message.

Initiating the communication may include preparing a phone text message by automatically entering the selected telephone number on the phone, preparing a body of the text message, and sending the text message.

Initiating the communication may include preparing a phone text message by automatically entering the text message but not entering the selected phone number.

General details of the above-described implementations, and other implementations, are given below in the DESCRIPTION, the DRAWINGS, and the CLAIMS.

BRIEF DESCRIPTION OF THE DRAWINGS

Implementations will be discussed hereafter using reference to the included drawings, briefly described below, wherein like designations refer to like elements. The drawings are not necessarily drawn to scale.

FIG. 5 is a user interface implemented using the system of FIG. 1;

FIG. 7 is a user interface implemented using the system of FIG. 1.

DESCRIPTION

Figure 1:
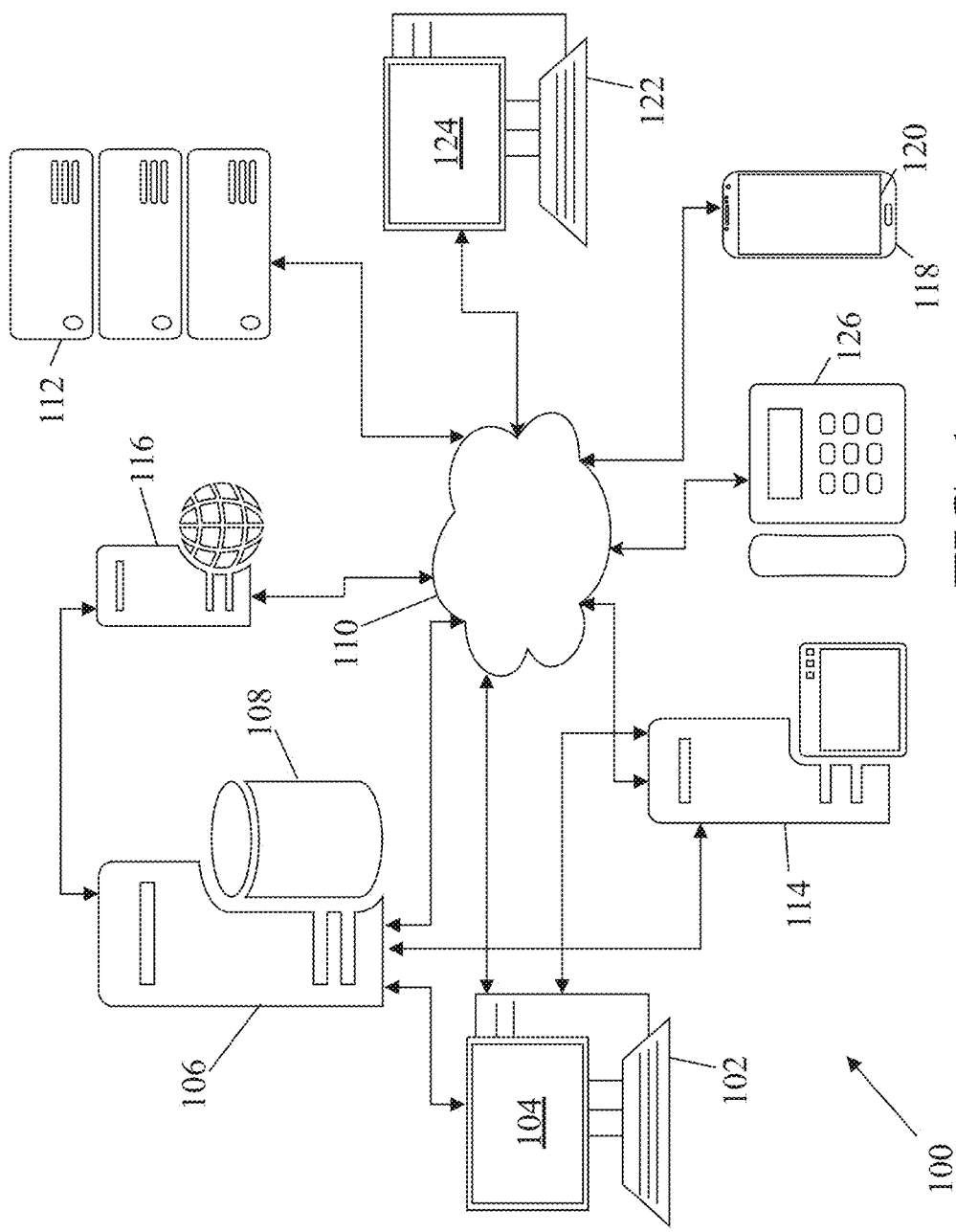
FIG. 1 is a diagram of a computing and communication system.

Implementations/embodiments disclosed herein (including those not expressly discussed in detail) are not limited to the particular components or procedures described herein. Additional or alternative components, assembly procedures, and/or methods of use consistent with the intended computing and communication systems and methods may be utilized in any implementation. This may include any materials, components, sub-components, methods, sub-methods, steps, and so forth.

The systems and methods disclosed herein provide new features for allowing web pages to have greater interaction with a local machine from which the web pages are accessed. Throughout this disclosure the systems and methods are called "Breezeway Link" components/methods as shorthand. Additionally, the term "Breezeway Link" is used herein to identify a selector on a web page (such as a link) which performs an operation on a local machine. The systems and methods utilize a set of technologies working in concert to perform local computer actions from web pages. For example, in implementations a web page communicates with a web server to authenticate the user. A separate local software application or phone application (mobile phone, voice over internet protocol (VOIP), or desk phone) communicates with the same web server. The Breezeway Link web server process matches these two secure connections and thus allows for a request made on a web page to interact with the local user computer and/or phone device. When the user activates (for example, clicks) a Breezeway Link selector on the web page, the appropriate information is transmitted by the web browser to a Breezeway Link capable server which then forwards the appropriate action to the local computer's Breezeway Link software application to perform local actions such as open a file (for example an MS WORD, MS EXCEL, PDF, JPG, TIFF, etc.) or search for or open a local folder or file (where the path is sent back to the server for later use) or to perform other user requested tasks on the phone or mobile device such as preparing or executing a phone call or preparing or sending a text message.

Web pages allow users to interact with web servers through links, buttons, selectors, and other user actions. However, by default web pages are not allowed to access the user's personal computer directly in any way. On mobile phone devices, web browsers do allow for phone calls by clicking on phone numbers within a web page. A link on a web browser on a personal computer may also be selected to execute a call on a cellular phone. However, there is a need for systems and methods that allow users to click on a link in a web browser on a personal computer to initiate a phone communication using a non-cellular phone, such as a desk phone (communicating with standard phone lines) or a turret type phone or a desk-based VOIP phone. The systems and methods disclosed herein allow for browsers on personal computers to initiate phone calls and texts on a phone that is not a cellular phone, such as a VOIP phone or a turret type phone or desk phone. Web browsers limit local computer interactions to file uploading/downloading (and save or open in some applications). In order for web applications to support access to reference files (such as PDF, WORD, EXCEL, JPG, TIFF, and other file formats) for a particular data record, the web application must first have access to a copy of such file by either having such reference file previously uploaded or having access to the file share hosting such reference files. The systems and methods disclosed herein allow for web pages to grant users access to files which may already reside on their own computers. Similarly, the systems and methods disclosed herein allow for web pages running on personal computers and/or non-phone devices to initiate phone interactions including calls and/or text messages.

Referring to FIG. 1, an example computing and communication system (system) 100 is shown. Not all computing and communication systems will include all of the elements shown in FIG. 1, and some may include additional components, but system 100 is given as an example. The system in this example includes an administrator computing device (device) 102 which includes a display 104. Through this device an administrator may configure certain aspects of the system, perform setup operations, interact with one or more data stores, configure user interfaces, and so forth. Device 102 is seen communicatively coupled with a database (DB) server 106 and correspondingly with a database (DB) 108 both directly and through a telecommunications network 110 such as, by non-limiting example, the Internet (in other implementations network 110 could be a local area network (LAN) or the like). In implementations a data store other than a database may be used, and one or more data stores may be included in any given system implementation.

A web server 116 is shown communicatively coupled with the database server directly and also indirectly with other system elements through network 110. The web server may facilitate the administrator(s) and/or end users interacting with the system through one or more websites. Remote servers 112 may be used for computing/processing/storage and are shown communicatively coupled with other system elements through network 110. An application server 114 is shown communicatively coupled directly with device 102 and with the DB server and also indirectly with other elements through network 110. The application server may facilitate the administrator(s) and/or end users interacting with the system through one or more mobile software applications. A mobile device 118 is shown communicatively coupled with other system elements through network 110. Device 118 includes a display 120 and may allow an administrator and/or an end user to interact with elements of the system through a browser installed on the mobile device and/or through a software application installed on the mobile device. Device 118 could be a mobile phone or tablet or the like. An end user computing device 122 is shown communicatively coupled with system elements through network 110 and includes a display 124. Through this device an end user may interact with the system through one or more user interfaces displayed on the display. Although device 122 is illustrated as a desktop personal computer, it could alternatively be a laptop, tablet, or other computing device. A phone 126 is shown communicatively coupled with system elements through network 110. The phone 126 is not a mobile cellular phone but is a desk phone (such as communicating through a standard phone line) or turret type phone or a voice over internet (VOIP) phone.

Although some communicative couplings are shown in FIG. 1, these are meant only as representative examples. While some elements are shown directly coupled together, in implementations they could be indirectly coupled together through network 110. While some elements are shown only indirectly coupled together through network 110, in implementations they could be directly coupled together such as through a wired connection. Although only one of each type of element is shown, in implementations this could be scaled up to any needed number—for example any needed number of web servers, application servers, data stores or databases, data store servers or database servers, remote servers, and so forth, may be included. While elements are shown as discrete components in FIG. 1, in implementations some of the elements could exist on a common machine through virtualization or the like.

Figure 2:
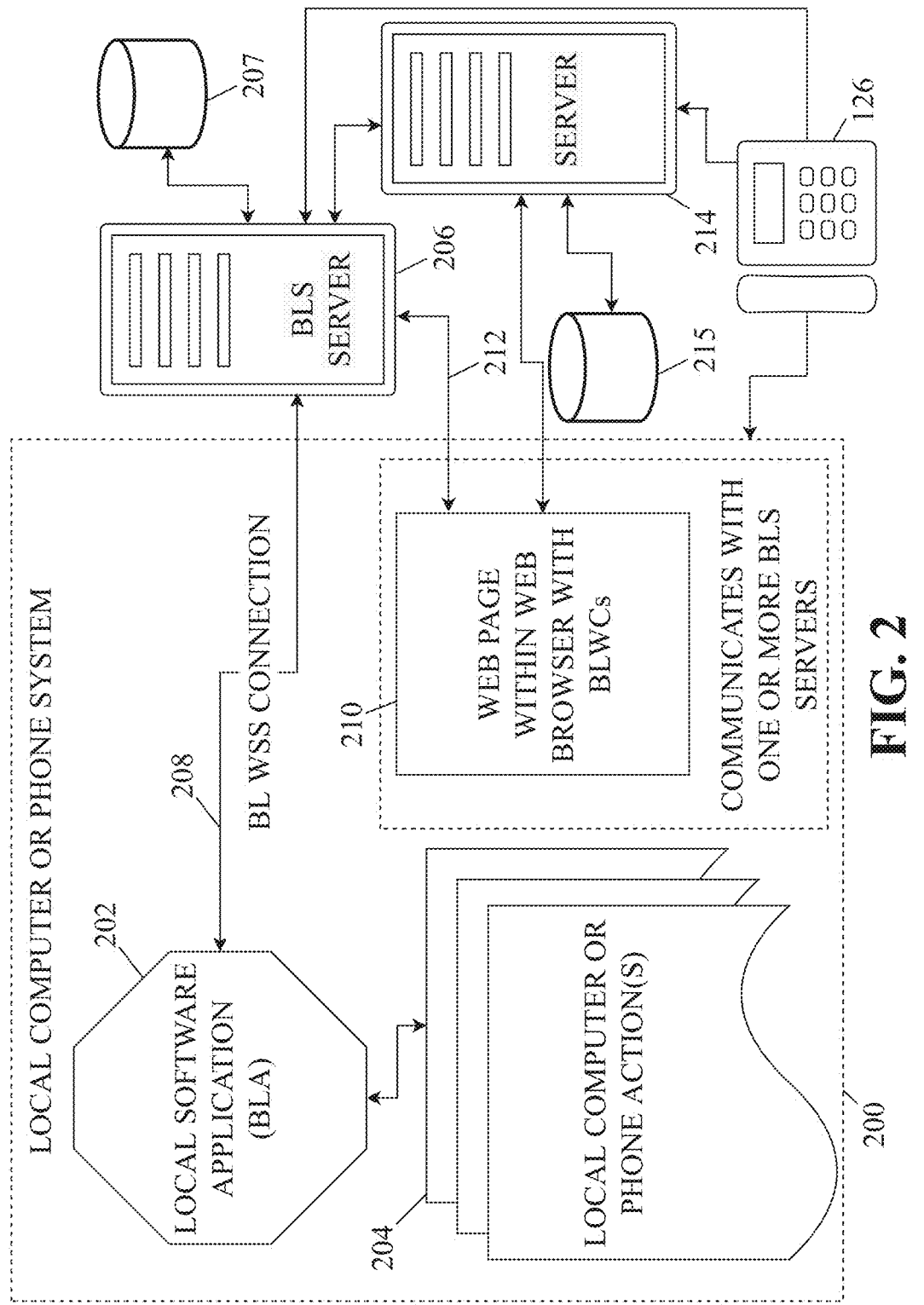
FIG. 2 is a diagram of elements and methods of the system of FIG. 1.

Referring now to FIG. 2, in implementations, in order for an end user to utilize the methods on a local computer or phone system 200, the end user installs a local Breezeway Link Application "BLA" (software application 202) on a local computer and/or phone device (desk phone or turret phone or VOIP phone) (such as phone 126). This BLA retains a set of instructions that it performs only when directed to by a Breezeway Link Service ("BLS") which is hosted on a web server or other server (i.e., server 206). The BLS, in turn, takes instructions from users through Breezeway Link Web Components ("BLWC") such as HTML anchors or AJAX connections with the BLS. The BLS, having authenticated both the BLA client and the BLWC client and matched them to the same active user session, transfers instructions to the BLA whenever a BLWC makes a request. The BLA may also communicate back to the BLS in cases when the request requires more information such as status or requests file information (path, size, access/creation time), or actual file contents. The BLS may also communicate back to the BLWC web application as needed for instance to display captured information back to the user on a web page.

In implementations the web server 206 could be communicatively coupled with a data store 207 to facilitate its operation (such as by using the data store to match users and credentials, adjust user settings and preferences, and/or for authentication and the like). The server 206 may also, in implementations, be communicatively coupled with a separate server 214 (and/or thereby with a separate data store 215) to facilitate the methods. For example, in implementations a banking website may be hosted by a bank server, but a separate server operated by an administrator of the system 100 may be used to facilitate the methods disclosed herein. For example a separate web service operated by server 214 may communicate with server 206, with server 214 being the main web server providing the web site the user is accessing and with server 206 (which may be a web server or other server type) facilitating the Breezeway Link features (by communication between servers 206 and 214). In other implementations, however, the bank server itself (206) may be configured to perform relevant method steps itself so that no separate server is needed, and the Breezeway Link features may be in effect embedded with web server 206. The elements of the local computer or phone system of FIG. 2 may be communicatively coupled with the Breezeway Link Services (BLSs) of the server 206 and/or server 214 and/or other external elements, for example, through the Internet or another telecommunications network. System 200 is seen to, in implementations, include a separate phone 126. Although some of the actions above are described as being performed by the phone system itself, the web page may not be displayed on the phone, and in such implementations there may be a separate computing device displaying the web page and the phone communicatively coupled therewith and/or with servers 206, 214, and other system elements as needed or desired.

Referring still to FIG. 2, in implementations the Breezeway Link Application (BLA) component resides on the local computer or phone running with permissions so as to access the local user session and thus allow for opening of documents and/or preparing/making calls and/or preparing/sending texts as per user requests. In implementations this BLA authenticates itself with the Breezeway Link Services (BLS) through a Breezeway Link (BL) Secure WebSocket (WSS) connection 208 or through single-sign-on facilities. The Breezeway Link Web Components (BLWCs) in implementations reside within web pages inside web browsers (such as SAFARI, CHROME, FIREFOX, EDGE, INTERNET EXPLORER, and so forth) running under an authenticated user session. These, in turn, authenticate themselves with Breezeway Link Services (BLS) through standard web connection protocols (such as HTTPS or WSS). The Breezeway Link Services (BLS) match up various BLWCs with the appropriate BLAs and thus facilitate local computer/phone activity from within web pages.

In implementations the device running the BLA process/application 202 (with access to the current user session on a personal computer or phone) and the device running the BLWC (web page within a web browser) 210 may not be the same device, though in the implementations shown in the drawings they are the same device. The Breezeway Link Services (BLSs) could be implemented on an external web/cloud server. A web connection 212 communicatively couples the BLS server with the BLWC device 210.

Local computer or phone actions 204 are performed by the user interacting with the web page, as described to some extent above. This may include, for example, opening a document with a local software application such as opening an EXCEL spreadsheet with MICROSOFT EXCEL, opening a WORD document with MICROSOFT WORD, opening a PDF file with ADOBE ACROBAT, and so forth. The actions could also include opening a file manager on a directory, finding a local file or folder, dialing a phone number, and so forth.

As a use case example, suppose a user is visiting a banking website, and on the banking website the user clicks on a Breezeway enabled link. This sends a signal to the bank's web server, which includes a request to open a document. The BLS server will receive the message and relay it over to the BLA component on the user's machine or otherwise give instructions to the BLA component to open the file locally. This example could include any browser, such as CHROME, SAFARI, and so forth. The BLA in this example is a separate software application on the operating system (OS) of the local computer, not a browser plugin. The bank's web server in this example could be BLS server 206, and server 206 could include an add-in or the like that facilitates the Breezeway Link Services, so that the BLWC simply communicates directly with server 206, the server 206 then communicates directly with the BLA 202, and the file is opened.

Alternatively or additionally, the BLWC could communicate directly with another server, server 214, which in this case is not a bank server, but is a server operated by an admin of the system 100. In this case the server 214 and BLS server 206 are in communication with one another, so that the BLWC 210 may communicate directly with server 214, which in turn communicates with BLS server 206 to effectuate a signal from BLS server 206 to BLA 202 to open the file. Alternatively or additionally, The BLWC 210 may not communicate directly with server 214. For example in some cases a browser can only communicate to a known server, so in this example the browser may only be able to communicate with the bank server (BLS server 206 in this example) and not the server 214 directly. Accordingly, the BLWC may communicate with the bank server (BLS server 206) which in this case may then communicate with server 214 for authentication and/or to receive instructions, and in response to one or more response signals from server 214 the BLS server 206 may then send one or more signals to BLA 202 to open the file locally or perform another local action. The BLS server 206 could also, upon receiving a communication from the BLWC 210, send instructions to the BLWC 210 to communicate with server 214, and then either the BLWC 210 or server 214 could send a signal to BLS server 206 to effectuate a signal to BLA 202 to execute the desired process. In these ways, the BLS servers act as a type of relay system to the local computer to facilitate opening of files locally on the local machine.

The BLA in implementations is actually a software program running on the operating system of the local machine, not part of the browser, and so can execute a process to request the finding and/or opening of a file or making a phone call or sending a text message as the case may be.

In implementations the BLWC resides on the web browser. When a user clicks on the web component there are usually a few possible actions, including an action to find a file and/or an action to open a file. If the BLWC sends a "find file" signal to the web server this is relayed to the BLA with instructions to find the location of the file. The file could be any file type and/or it could be a directory (for example the directive could be to find the directory for an asset, e.g., where all the files for the asset reside or just the location of the single latest appraisal PDF document). The instructions are relayed to the BLA on the local computer. The BLA on a PC could be, for example, a WINDOWS software application (though in other implementations it could be a LINUX or MACOS or other operating system software application) that has access to the operating system (OS) and can ask the OS to search for the file or open the file. The instructions are relayed to the BLA on the user's machine to open the file or otherwise perform the action.

From the perspective of the end user the website may appear as any other website, with no visual difference. With the above banking example, the user's banking website may appear as it always does regardless of whether the Breezeway Link components/services are active. When the Breezeway Link components/services are enabled, however, when the user clicks on a document or folder link on the banking website, if the document or folder already resides on the user's machine (or a file share such as on a LAN which the local machine has access to), the local document or folder is opened instead of a copy being downloaded from the remote banking server.

A Breezeway Link on a website is in some ways similar to other links—it is an anchor with information indicating parameters to follow. The Breezeway Link may initiate a JAVASCRIPT/AJAX program on the page and the AJAX program may initiate a Secure WebSocket communication to the BLS server, which matches up the request and communicates to the BLA to find/open the file. The message from the BLS server to the BLA may include an indication that the file is on the local computer and/or instructions to open the file locally. If the file is not stored locally then a signal can be sent back to the server saying that the file is not stored locally. In that case the file can be downloaded or some other action can take place, the file may also be downloaded to the local computer on a separate channel without involving the web browser. If the file is already stored locally, it could be stored locally in a cloud folder, for example it could be a local copy of a file in a DROPBOX, BOX, GOOGLE DRIVE, MICROSOFT ONEDRIVE, or other cloud storage folder. The file could, accordingly, be backed up to a cloud drive, but a local copy could be present on the machine, and this may be the copy that the BLA requests to find/open.

The file could alternatively be located on a file share, such as a network attached storage (NAS) or mapped network drive folder, and the BLA may request to open the file from the NAS or file share or networked folder on the local computer. In any case, the file may be a file that is shared among users so that multiple users may edit the file at different times. Thus if a first user navigates to a website and clicks on the document link, the document from the file share may be opened on the first user's computer for editing and the like. If a second user later navigates to the website and clicks on the document link, the same document from the file share may be opened again, this time on the second user's computer, for editing and the like. In implementations the systems and methods herein need not deal with situations where multiple users attempt to open the same document at the same time, because the operating systems and file sharing applications of the user computers (DROPBOX, BOX, GOOGLE DRIVE, etc.) may already have built in mechanisms to resolve situations where one user's computer requests to open a file that is already opened on another user's computer.

As indicated above, in implementations the BLWC is not a plugin on the browser itself, but the web server could have visual links embedded into the website (a controller may be used for this purpose) so that when a user clicks on an appropriate link the processes described herein initiate opening a file locally. Links can run JAVASCRIPT, but a model view controller (MVC) on the web server or separate BLS server may be used to facilitate the functionality to open the file on the local machine.

In other implementations the BLWC could be or could include a plugin on/in the browser itself instead of a component on the web server. The plugin itself could be configured to scan a page, find anchors that are Breezeway Link compatible, and communicate directly to the Breezeway Link Services server as necessary. In this case the BLS server may be a standalone service separate from any website, so that when the user clicks a link the signals/instructions go through the BLS server through Secure WebSocket instead of going through the web server.

The systems and methods may be configured to listen (or regularly check) on a folder to automatically upload new files to the web server or another server when the local file/folder is modified. It can look every minute, for instance, or it can look on some other schedule. The user in this case just works normally and saves files locally, and on the back end everything is automatically saved to the appropriate remote server. The user in implementations may receive a notification or email that the files were uploaded/modified, the notification/email being facilitated by the system 100. This "loader" facility accordingly may automatically transmit files over to a remote server if something new is found, or may modify/delete files/folders or signal that some modification/deletion occurred locally.

The above banking example is just a representative example, and there are others that could be given. In the financial and mortgage industries for example there are large data exchanges that happen on a regular basis. A mortgage owner that owns a thousand residential mortgages may receive daily updates (sometimes called a tape or tape load) which may include EXCEL spreadsheets with data—such as who has paid, who hasn't paid, payment amounts, payment dates, etc. When the owner receives these they can be saved into a directory. The loader facility may automatically listen on the folder where such files are placed so that it can upload them automatically to a remote server, process them, and automatically report to the user that the files were uploaded. More detailed reports could be facilitated by the system 100 and could include information from the files themselves, such as a report indicating the total amounts paid, the total amounts delinquent, and so forth.

In financial and in many other industries it is common for employees to have many files in a large shared folder, such as a shared BOX or DROPBOX or other shared location. The systems and methods disclosed herein allow for more accurate and up-to-date files. Traditionally if a user makes a change to a file but has not yet uploaded the changed file to a web server, then if a second user downloads the file from the web server the second user has an out-of-date file. With the system and methods herein, however, when the second user clicks on a link to open the file it opens the same file that the prior user already changed, so that the second user has the most up-to-date file.

As indicated to some extent above, Breezeway Link Web Components (BLWCs) in implementations are standard HTML/AJAX components which are configured to communicate with Breezeway Link Services (BLSs). BLSs in implementations are web services, such as web application programming interface (WEBAPI) servicer or model view controller (MVC) actions that are designed to perform Breezeway Link functions. Local computer or phone Breezeway Link Applications (BLAS) in implementations are local computer applications (such as WINDOWS FORMS (WINFORMS), windows presentation format (WPF), console applications, or similar user applications on non-WINDOWS computers or phone devices) and/or services which allow for interaction with the current user session. BLAs may communicate with BLSs though Secure WebSockets or other network protocols. The initial handshakes between the BLAs and the BLSs may include session identification tokens; the BLA may include facilities for capturing user-specific credentials such as fields for usernames/passwords and/or Globally Unique Identifiers (GUIDs) or use single-sign-on facilities. A BLS may message a BLA to request such information from the user and the user may choose to change the active BLA's authentication credentials. After receiving a request from a BLWC (such as to open a file or folder or prepare or execute a call or text) or after receiving a message from a BLA (including data such as file path, phone number, contents, date information, handshaking information, or upload and process instructions), the BLS may process the request or message, may attempt to find a matching BLA or BLWC session respectively, and may relay instruction or information from one Breezeway Link (system) component to another.

Figure 3:
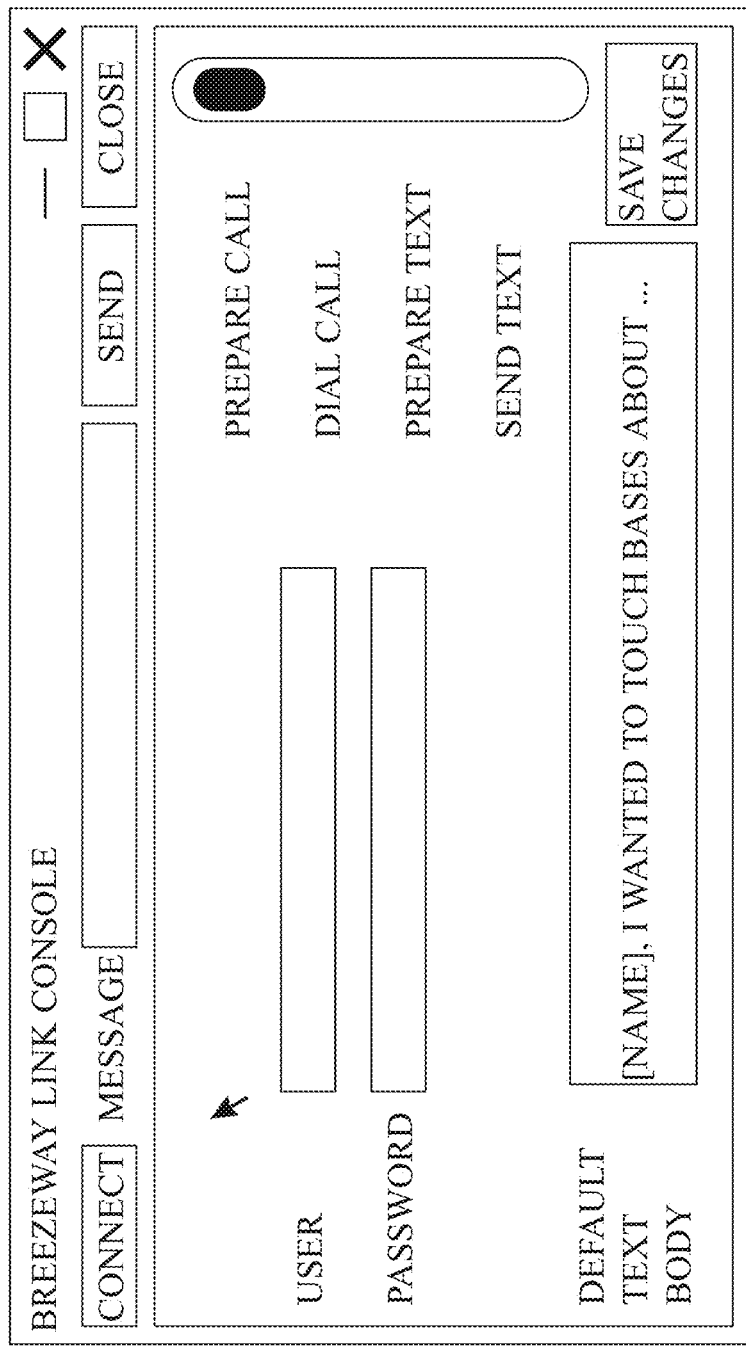
FIG. 3 is a user interface implemented using the system of FIG. 1.

Referring now to FIG. 3, user interface (interface) 300, which may be displayed on a user's computing device using the BLA software application, may allow the user to log in using a username and password. Interface 300 may, accordingly, be called an authentication interface. The user may enter credentials and click the CONNECT selector to log in to the service and connect to the remote server (running BLS) to allow the methods. Optionally, A MESSAGE field and SEND selector are also shown, which may allow the user to send a message, for example to an administrator or the like to deal with an issue or so forth. The radio/toggle selector (PREPARE CALL, DIAL CALL, etc.) will be described below.

Figure 4:
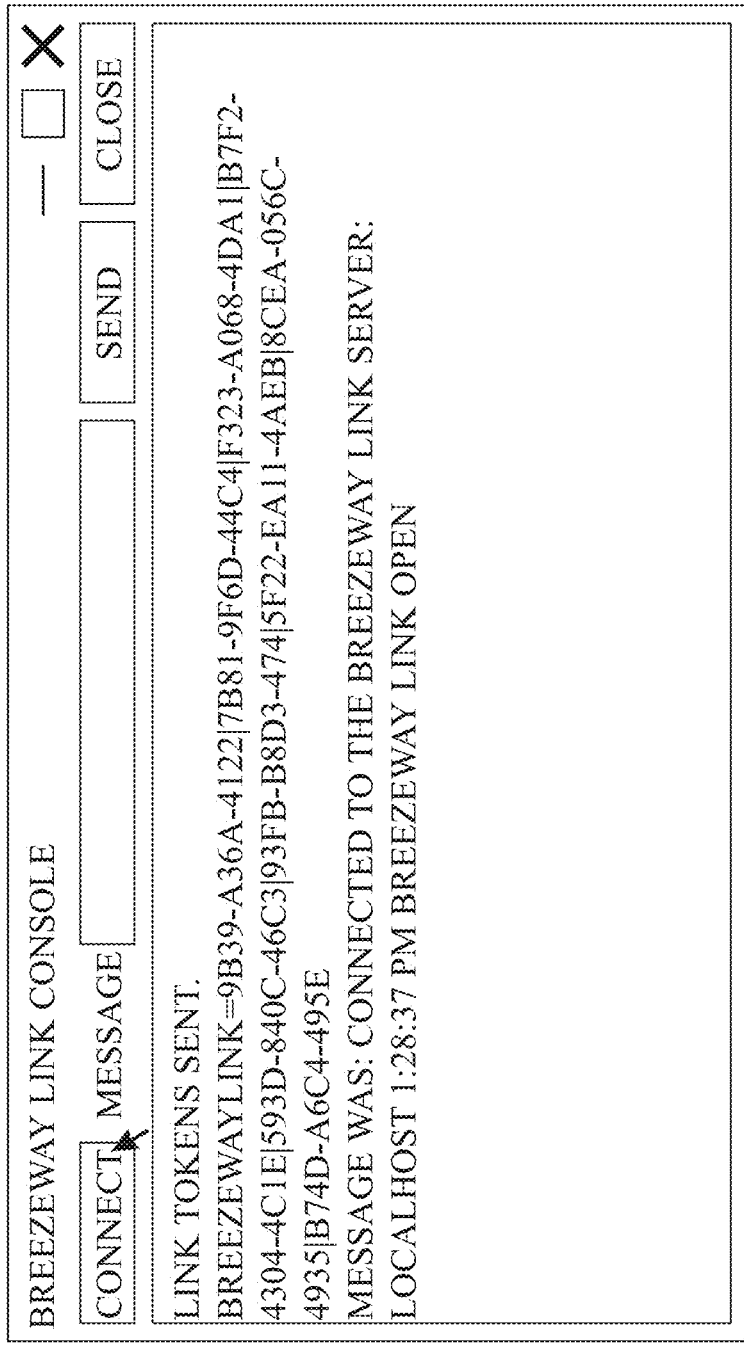
FIG. 4 is a user interface implemented using the system of FIG. 1.

In FIG. 4 the user has entered the login credentials and has selected CONNECT, and the authentication process details are displayed, indicating that the local machine's Breezeway Link Application (BLA) is connected with the server 206 running Breezeway Link Services (BLS). This representatively illustrates some of the handshaking that goes on behind the scenes. In some implementations, authentication could occur from a user simply selecting the CONNECT selector (for example without entering the username and password, or no username and password fields may be included or needed). In other implementations, when the user opens or runs the Breezeway Link Application (BLA) on the local machine, the connection between the local machine and remote server may be established automatically behind the scenes so that the user does not need to select CONNECT or the like in order to establish the connection.

As indicated above, in implementations to actually use the Breezeway Link methods the user may have a web application that is Breezeway Link compatible and that connects to Breezeway Link Services.

There are a variety of situations in which the systems and methods disclosed herein will be useful, some of which are given above, and others of which are described below. Suppose a financial web-based software includes many loan/property details. A user would like to quickly access some related documents such as appraisals, closing documents, and financial models both to edit and/or review. A Breezeway Link could be used to quickly access the appropriate related files within the local computer without the need to have multiple copies of a working document and without having to search through large file systems or having to transfer large amounts of file data since the Breezeway Link simply instructs the local computer to open the appropriate file and resources already existing at the local machine.

As a further example, suppose that while analyzing a portfolio of assets from a cloud-based web application a user would like to quickly reference the financial model in an EXCEL spreadsheet related to a particular investment. The web application could contain a Breezeway Link to effectuate quick access to the relevant document(s).

Additionally or alternatively, a user my wish to quickly reach a client on a client relationship management (CRM) or customer lifecycle management (CLM) application. The user could click on the phone number on his desktop web browser and his desk phone or turret type phone or VOIP phone could immediately prepare or execute a call or text. With regards to the system facilitating phone calls and the like, one or more user interfaces could be configured to allow a user to select a default operation. Interface 300 of FIG. 3, for example, allows the user to toggle between a default setting for when the user clicks on a phone number in a web page. For example, the user may select from preparing a call (entering a phone number in a phone but not dialing it), dialing a call, preparing a text (which in implementations could be entering the number for the text and/or populating a default message), and sending a text (which inherently includes preparing a text).

A user can easily upload files to web servers through Secure WebSocket by placing them within some designated upload folder. Files, such as servicer remittance information (daily/monthly dept payments), could be automatically uploaded and processed by web servers thanks to Breezeway Link triggers (in this case a BLA to BLS process).

Figure 5:
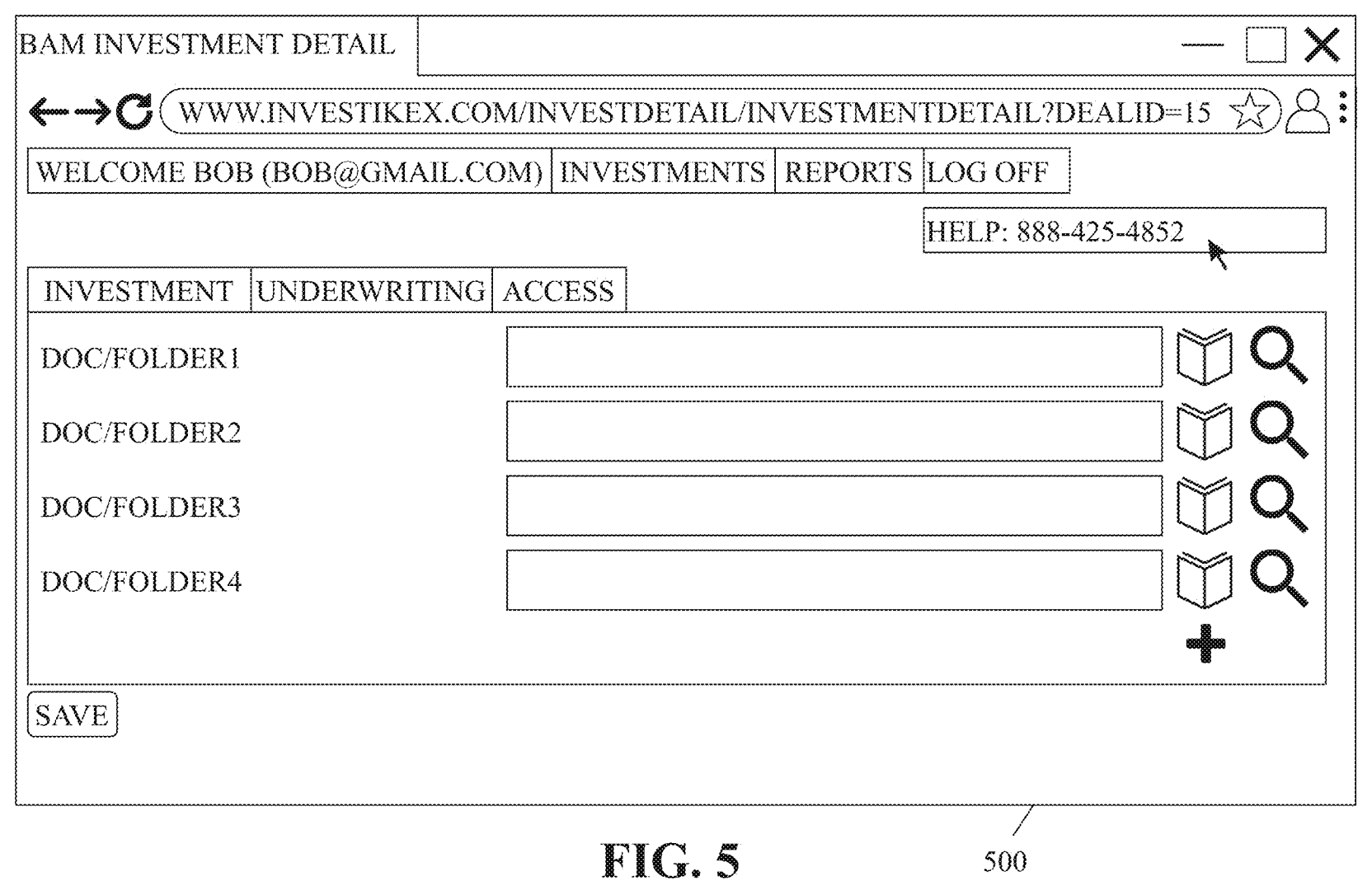
Figure 6:
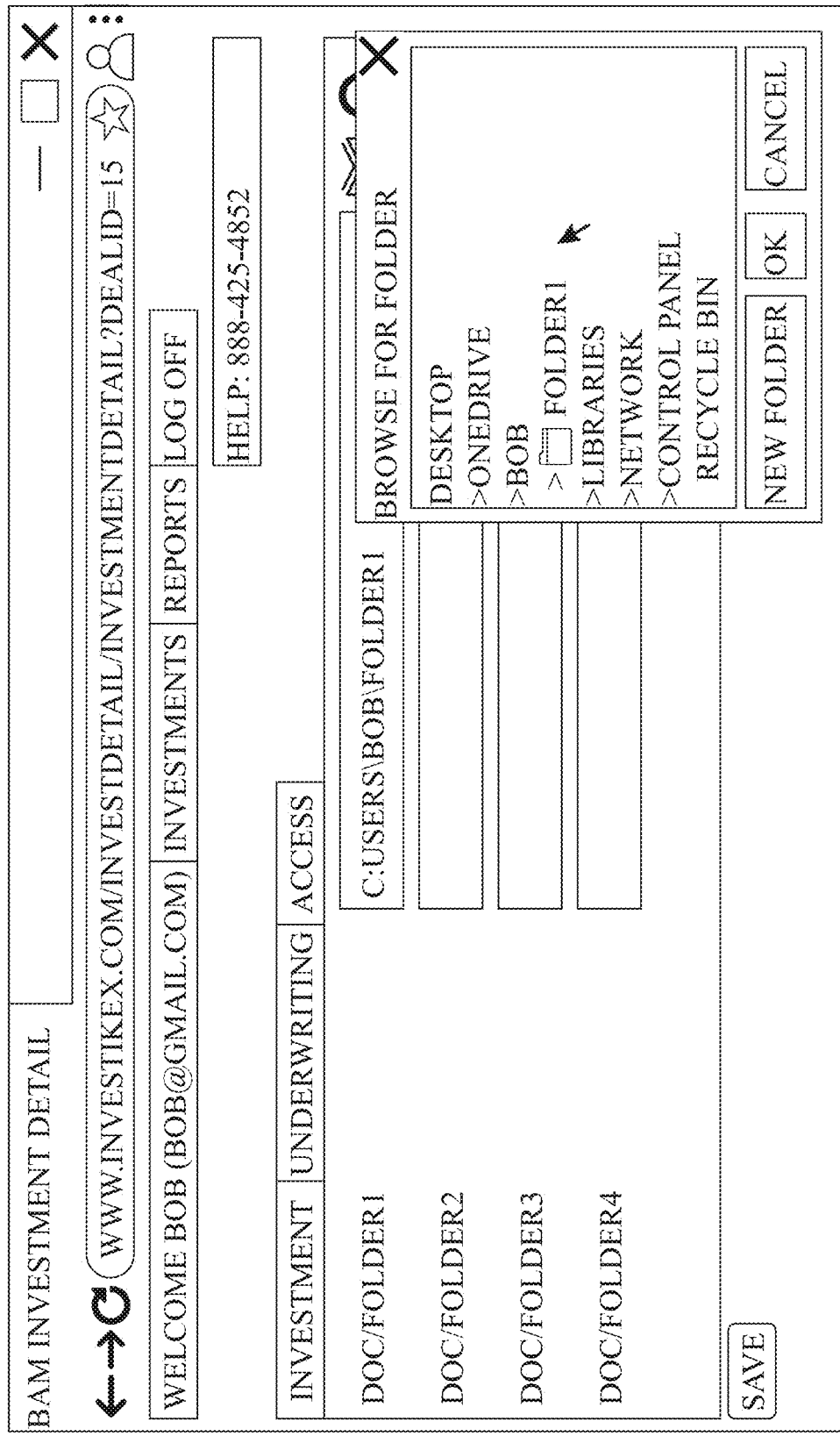
FIG. 6 is a user interface implemented using the system of FIG. 1.
Figure 7:
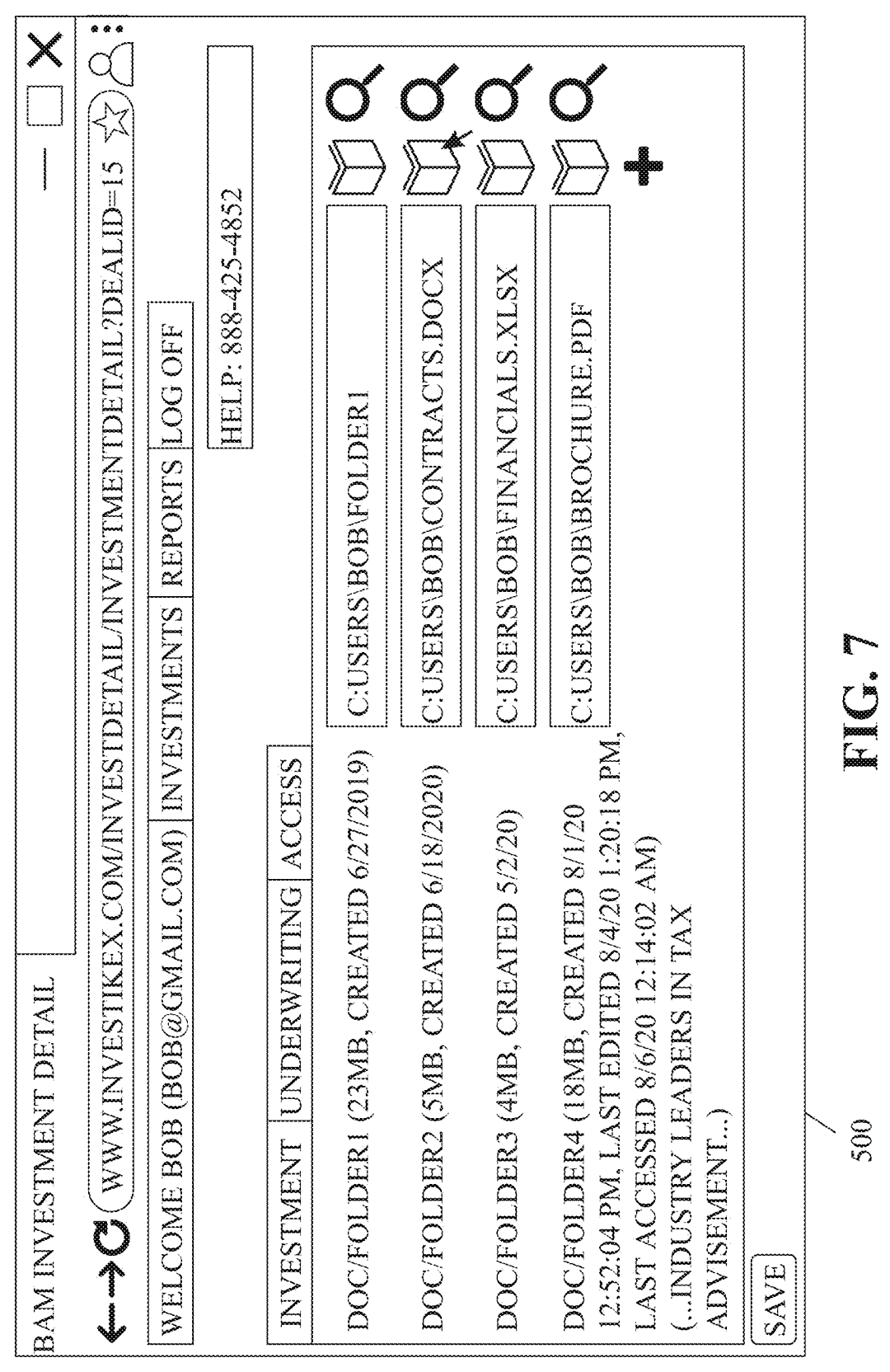

Reference is now made to FIGS. 5-7, which show user interfaces (interfaces) 500 displayed on the local computer. The user interfaces 500 are web pages displayed in an Internet browser. In this representative example the browser is open to a "www.investikex.com" website (which is a fictional website only used for purposes of this example). On the website are a number of tabs and the like for navigation. A HELP phone number is displayed on the website, and the user may hover the cursor over this area (as seen in FIG. 5) and click to select the phone number, which could initiate any of the phone operations previously described.

Interface 500 also includes a number of document/folder fields (each identified by DOC/FOLDER1, 2, 3, etc.). The fields are shown as blank in FIG. 5. Next to each field is a selector resembling an open book, and next to each of these is a search selector (resembling a magnifying glass). At the bottom of the book-like icons is a plus icon, and at the bottom left is a SAVE selector.

Referring now to FIG. 6, the user in this implementation has selected the search selector on the topmost row (DOC/FOLDER1) and this opens a file explorer window on the local machine (this is simply the file explorer of the local machine's operating system itself). From this file explorer the user in this example navigates to a folder titled "FOLDER1" and clicks on it, thus selecting it (this could be done by single clicking and pressing OK, or double clicking, and alternatively the CANCEL selector could cancel the operation or the NEW FOLDER selector could be used to create a new folder). After the user has selected FOLDER1 the DOC/FOLDER1 field then displays the file path for the folder, which in this case is C:USERS\BOB\FOLDER1. After mapping the folder in this way, the user could select the book-like icon/selector in the first row (DOC/FOLDER1) and the actual folder associated with the file path will be opened on the user's local machine. When the user exits the browser session and later returns to this website, the saved DOC/FOLDER1 configuration will remain, so that the user may later select the book selector to open the associated folder on the local machine. The selected folder could have any name, and "FOLDER1" is only an example (the name of the row as DOC/FOLDER1 and the name of the actual selected folder as FOLDER1 in this example is only coincidence).

In implementations the mapping may also automatically upload all contents of the folder to the remote server (BLS or another server). In such implementations, if the user adds a document to the folder on the local machine, it will be automatically uploaded to the BLS or other server as well. Similarly if a user deletes or renames a file within the folder (or the folder itself), those changes may be automatically mirrored on the BLS or other server. In this way the BLS or other server may have a copy of the folder and its contents, but when the user returns to this website page and clicks on the book icon, it is the local copy on the user's local machine that is opened. This means that the local computer does not necessarily download a new copy each time the user selects the file on a web browser. This is contrary to how file links on web pages normally work. In general, when a user is on a web page and selects a document link, a separate copy of the document is automatically downloaded to the local machine from a remote server associated with the web page (a web server or other server or the like). If the user continues clicking on the document link then additional copies of the document will be downloaded again and again. If the user for example navigates to the page several times in a day and clicks on the document link the local computer may have multiple downloaded copies of the file. These are normally downloaded to a local DOWNLOADS folder or to another default location determined by the browser settings.

The downloading of new copies of the document from the remote server is inefficient if the user already has the document stored on the local machine. Additionally, such downloading wastes computing resources (memory, processing resources) and contributes to the quicker degradation of computer memory components as well as leads to confusion as to which copy of the document is the most recently edited version. Solid state drive (SSD) storage and flash memory, for example, degrade with repeated cycles. The more write cycles, the more quickly the memory/storage degrades. Accordingly, the systems and methods herein improve the functioning of a computer itself in at least a few ways. One way is that the systems and methods herein reduce the overall write cycles of a memory or storage element, which in the case of a solid state drive (SSD) or flash memory will increase the life and reduce the degradation of the memory. Additionally, the systems and methods herein reduce the amount of energy needed for data transfers as well as memory/storage used at any given time, freeing up memory/storage for other items, by not having redundant copies of a file in the local DOWNLOADS folder or other location, but instead simply opening the local copy of the document/folder each time the user clicks on the document/folder link on the web page instead of downloading a copy of the file. In at least these ways, the systems and methods described herein improve the functioning of computers.

The storage of one copy of each selected document/folder on the remote web server may be useful in some instances in case a file or folder on the local machine is accidentally deleted or moved or the user changes to a computer without a direct link to that file store. In some implementations the remote web server (BLS or other server) could show files and/or folders that used to be on the local machine but that have been deleted, and if a user selects a BLWC selector referring to such a file or folder, that file or folder may be downloaded to the local machine instead of opening a local copy since, in that circumstance, there is not a local copy yet or any longer. In some implementations, Breezeway Link components could be used to track the location of downloaded files on the local machine (so that the user does not need to manually move the copy to the relevant folder—though it could be manually placed in the appropriate folder as well) so that later, when the user clicks on the link in the browser, it reverts to opening the local copy instead of downloading a new copy. In some implementations the downloaded file (downloaded when it is missing from the local machine) may by default download to the relevant folder on the local machine, instead of to the local machine's downloads folder, so that the user does not need to manually move the downloaded file to the appropriate folder.

In some web applications, the "plus" icon at the bottom of interface 500 may be used to add new rows, for new documents/folders, so that the user may link to as many documents/folders as desired. The SAVE selector may be selected to save the configuration. In implementations if the user navigates away from the web page or clicks to close the window, a popup may ask the user whether he/she wishes to first save the configuration. In other implementations if the user navigates away or closes the web page the changes are simply not saved. In some implementations an auto-save feature may be active, which may save changes automatically (and/or which may allow a user to revert to prior configurations in case a change was made by accident or if the user otherwise wishes to undo it).

Referring now to FIG. 7, it is shown that the user has linked one folder and three documents through the web page. The first row shows the "FOLDER1" folder previously discussed. The second row indicates a link to an MS WORD document (in this case called CONTRACTS.DOCX). The third row indicates a link to an MS EXCEL spreadsheet (in this case called FINANCIALS.XLSX). The fourth row indicates a link to a PDF document (in this case called BROCHURE.PDF). These examples show that the systems and methods herein may be used to link the web page with various document types, including MS WORD or other text documents, MS EXCEL or other spreadsheet documents, PDF documents, and so forth. Other examples are not shown but could include any type of file format, such as any document, image, spreadsheet, or other type of file.

The first or top book icon/selector of FIG. 7 (and any such link mapped to a folder) may be referred to as a "folder selector" inasmuch as it corresponds with a folder already residing on the computing device (or residing on a file share or shared folder accessible by the computing device) and, when selected, initiates opening of the folder locally on the computing device (without necessarily downloading a copy of the folder's contents to the computing device from a remote server). The local BLA application facilitates the opening of this local folder. The second and later book icons/selectors of FIG. 7 (and any such links mapped to a file) may be referred to as "file selectors" inasmuch as they each correspond with a file already residing on the computing device (or residing on a file share or shared folder accessible by the computing device) and, when selected, initiates opening of a file (DOCX, XLSX, PDF, JPG, TIFF, etc.) locally on the computing device (without necessarily downloading a copy of the file to the computing device from a remote server). The local BLA application facilitates the opening of the local files. Accordingly, each of the book-like links become either a "folder selector" or "file selector" depending on whether it is mapped to a folder or a file.

Each magnifying glass icon of FIG. 7 (search selector) may be called a "folder path selector" and a "file path selector" inasmuch as each, when selected, allows the user to select a folder location or a file location to which the corresponding folder selector or file selector will be mapped.

FIG. 7 also shows that file information is included for each file. For brevity the first three files/folders only show the file size and a created date. The last row, however, shows that more details could be included, such as a created time, a last edited date, a last edited time, a last accessed date, and a last accessed time or excerpts or key words related to the file or folder (in this case the system extracts the phrase "INDUSTRY LEADERS IN TAX ADVISEMENT" from the document and displays it for the user. In other cases multiple phrases or words could be shown to the user, to help the user determine if this is the proper file they want to open. The file path fields also show the document type to the user (DOCX, PDF, etc.) and, optionally, the file location.

The user interfaces of FIGS. 5-7 are simplified so as to only show some details—in reality the website could include many other elements unrelated to the instant invention. For example a banking website could include information about balances, bills, deposits withdrawals, etc., and on one or more pages could include linked documents. In that case the linked documents may be shown with a format somewhat similar to that shown in interface 500, with document links that may be clicked on to open local copies of the documents. For example a user's monthly statements could be linked to in this way.

Although the end user has been described herein in a way that may imply an individual end user, in implementations the end users could be part of an organization. For example the end users may be employees of a bank itself accessing a bank web page and reviewing documents related to loans or the like—in which case different employees may be able to review the same local document instead of each downloading a new copy. In that type of a setting there may be a shared folder or file share which holds the original document and each individual employee's local machine may simply access the document on the file share instead of downloading a new copy from the web page.

In implementations when the user opens/accesses a document that is linked to from interface 500 the user may of course edit and save changes to the document, since the document is already the local version, and since these changes do not change the file path. When the user later opens the document from the web page, it simply uses the file path and opens the local file, which already reflects the last changes.

As another use case example, in financial appraisal settings there may be multiple appraisal documents (such as PDFs) and financial analysis spreadsheets (such as MS EXCEL files). Things can get confusing if each time the user clicks on a document on a related web page a new copy of the file is downloaded to the local machine. Accordingly, the ability to use the link to simply open up the local copy ensures that the user does not have multiple copies of the same file which could lead to errors (for example some changes being made in one file, and different changes being made to another file, instead of all relevant changes being made to a single file when there is only one file to begin with).

There are other advantages of the systems and methods disclosed which will be apparent to the practitioner of ordinary skill in the art.

The systems and methods herein accordingly allow for local computer processes to be activated from within web pages, including but not limited to actions that allow for local files to be opened from actions within web pages, local file information to be accessed by authenticated web services, local file size/path information to be captured by authenticated web services, and Secure WebSocket file upload into a particular web service session. They also allow for a phone call to be started or prepped (numbers set up or entered on the phone device but not executed until receipt of a user's manual execution selection/command) and allow for a phone text to be sent or prepped (recipient number entered on the phone device and/or an initial text message drafted, but not actually sent until receipt of a user's manual execution selection/command).

In implementations in which the systems and methods herein are used to initiate phone communications, the Breezeway Link components could be used to communicate with VOIP servers. The phone which the system uses to initiate a communication may be a WiFi enabled phone, but in implementations it may not be a cellular phone configured to communicate through cellular towers but may be a desk phone (communicating through traditional phone lines) or a VOIP phone, or turret type phone for example.

Although not shown in FIG. 2, in implementations involving automated communications using a phone, the "local computer or phone system" may involve both a computing device (running the BLA) and a phone communicatively coupled with the computing device directly and/or through a LAN and/or through one or more VOIP servers. The BLA in this case may facilitate initiation of the phone communication by communicating with the phone directly and/or through a VOIP server, or through another device and/or through another software application or the like, to send one or more signals to enter the number and/or enter a body of a text and/or execute a call or text or play an audio message. In implementations wherein the system prepares a draft body of the text the system may have an already-included default text body, or multiple selectable text bodies to pick from, or the user may have a custom default text body such as the one input on the relevant field shown in FIG. 3. The SAVE CHANGES selector of FIG. 3 may be used to save the user's selections of default text body and the selection between preparing a call, dialing a call, preparing a text, and sending a text. Although FIG. 3 is a login screen and also shows some settings which may be edited and saved before logging in, in implementations these functions could be on different user interfaces, for example one interface for logging in and another for changing settings. The same goes for other user interfaces of system 100—functions may be on different user interfaces or combined onto the same interface.

Although this description includes descriptions of specific visual icons (that of a book, a magnifying glass for a search function, and so forth), other visual indicators and selectors could be used on the user interfaces (such as, by non-limiting example, underlining to indicate a linked file or folder, a border to indicate a selectable link, a different visual image than those shown in the drawings, etc.). Similarly, although specific hardware and/or software components are described herein, including specific software applications and software languages, in implementations other software applications, software languages, hardware components, and the like may be used to implement the systems and methods, as will be understood by the practitioner of ordinary skill in the art.

In places where the phrase "one of A and B" is used herein, including in the claims, wherein A and B are elements, the phrase shall have the meaning "A and/or B." This shall be extrapolated to as many elements as are recited in this manner, for example the phrase "one of A, B, and C" shall mean "A, B, and/or C," and so forth. To further clarify, the phrase "one of A, B, and C" would include implementations having: A only; B only; C only; A and B but not C; A and C but not B; B and C but not A; and A and B and C.

In places where the description above refers to specific implementations of computing and communication systems and methods, one or more or many modifications may be made without departing from the spirit and scope thereof.

Details of any specific implementation/embodiment described herein may, wherever possible, be applied to any other specific implementation/embodiment described herein. The appended claims are to encompass within their scope all such changes and modifications as are within the true spirit and scope of this disclosure.

Furthermore, in the claims, if a specific number of an element is intended, such will be explicitly recited in the claim, and in the absence of such explicit recitation no such limitation exists. For example, the claims may include phrases such as "at least one" and "one or more" to introduce claim elements. The use of such phrases should not be construed to imply that the introduction of any other claim element by the indefinite article "a" or "an" limits that claim to only one such element, and the same holds true for the use in the claims of definite articles.

Additionally, in places where a claim below uses the term "first" as applied to an element, this does not imply that the claim requires a second (or more) of that element—if the claim does not explicitly recite a "second" of that element, the claim does not require a "second" of that element.

Additionally, in some implementations, the act of opening a file locally may cause it to be downloaded from a cloud server or services onto the local device and such behavior is included in the claim statement of "already residing on a file share accessible by the computing device." From the local machine's point of view, the file is being opened as if it were already residing on its hardware, but the file may actually not be stored locally but on a remote machine (e.g., DROPBOX, BOX, GOOGLE DRIVE, etc.). The file in such instances is, however, not downloaded through the Internet browser from the web server (or a device connected with the web server) providing the website on which the link is displayed to the user.

What is claimed is:

1. A computing and communication system, comprising:
   one or more servers communicatively coupled with a computing device through a telecommunications network;
   one or more user interfaces displayed on a display of the computing device, the one or more user interfaces displaying:
      an Internet website provided by the one or more servers and accessed using an Internet browser; and
      a resource selector displayed on the Internet website;
   wherein the resource selector comprises a link to an original resource, the original resource comprising one of a file and a folder, the original resource already residing on one of:
      the computing device; and
      a file share by that is mapped on the computing device;
   wherein the resource selector is configured to, in response to being selected, initiate opening of the original resource locally on the computing device without downloading a copy of the original resource through the browser;
   wherein the opening of the original resource is facilitated at least in part by a local software application running on the computing device; and
   wherein the system is configured to open the original resource from an original location regardless of where the original location is located on the one of the computing device and the file share.

2. The system of claim 1, wherein the original resource is an original file, the system further comprising a file path selector displayed on the Internet website, the file path selector configured to facilitate a user selection of the original location of the original file; and wherein the system is configured to open the original file without requiring that the original file be duplicated.

3. The system of claim 1, wherein the original resource is an original folder, the system further comprising a folder path selector displayed on the Internet website, the folder path selector configured to facilitate a user selection of the original location of the original folder; and wherein the system is configured to open the original folder without requiring that the original folder be duplicated.

4. The system of claim 1, wherein the resource selector comprises a folder selector, wherein the folder selector corresponds with an original folder; wherein the folder selector is configured to, in response to being selected, initiate opening of the original folder locally on the computing device without downloading a copy of the original folder's contents through the browser, and wherein the opening of the original folder is facilitated at least in part by the local software application.

5. The system of claim 1, wherein the one or more servers comprise a web server, and wherein the local software application opens the original resource in response to one or more communications from the web server.

6. The system of claim 1, wherein the original resource is an original file, and wherein the one or more user interfaces further display file information displayed on the Internet website, the file information corresponding with the original file, the file information comprising an original file location and one or more of: a file type, a file size, a file creation date, a file creation time, a last edited date, a last edited time, a last accessed date, a last accessed time, and an excerpt of one or more words within the original file.

7. A computing and communication method, comprising:
   providing one or more servers communicatively coupled with a computing device through a telecommunications network;
   displaying one or more user interfaces on a display of the computing device, the one or more user interfaces displaying:
      an Internet website provided by the one or more servers and accessed using an Internet browser; and
      a resource selector displayed on the Internet website;
   wherein the resource selector comprises a link to an original resource, the original resource comprising one of a file and a folder, the original resource already residing on one of:
      the computing device; and
      a file share that is mapped on the computing device;
   wherein the link is created without requiring that the original resource be duplicated;
   in response to receiving a user selection of the resource selector, initiating opening of the original resource locally on the computing device without downloading a copy of the original resource through the browser;
   wherein the opening of the original resource is facilitated at least in part by a local software application running on the computing device.

8. The method of claim 7, wherein the original resource is an original file, the method further comprising displaying a file path selector on the Internet website, the file path selector configured to facilitate a user selection of an original location of the original file; and wherein the system is configured to open the original file without requiring that the original file be duplicated.

9. The method of claim 7, wherein the original resource is an original folder, the method further comprising displaying a folder path selector on the Internet website, the folder path selector configured to facilitate a user selection of an original location of the original folder; and wherein the system is configured to open the original folder without requiring that the original folder be duplicated.

10. The method of claim 7, wherein the original resource is an original folder, the method further comprising displaying a folder selector on the Internet website, wherein the folder selector is configured to, in response to being selected, initiate opening of the original folder locally on the computing device without downloading a copy of the original folder's contents through the browser, and wherein the opening of the original folder is facilitated at least in part by the local software application.

11. The method of claim 10, further comprising, in response to user modification of the original folder's contents locally on the computing device, automatically modifying a copy of the original folder's contents on at least one of the one or more servers to match the modifications on the computing device.

12. The method of claim 7, wherein the original resource resides on the computing device prior to user selection of the resource selector, and wherein the system is configured to open the original resource from an original location regardless of where the original location is located on the one of the computing device and the file share.

13. The method of claim 7, wherein the original resource is an original file, the method further comprising displaying, on the Internet website, file information, the file information corresponding with the original file, the file information comprising one or more of: a file name, a file type, a file size, an original file location, a file creation date, a file creation time, a last edited date, a last edited time, a last accessed date, a last accessed time, and an excerpt of one or more words within the original file.

14. The system of claim 1, wherein the system is configured to open the original resource without requiring that an original folder, within which the original resource resides, be synchronized with a duplicate of the original folder.

15. The system of claim 1, wherein the link to the original resource is created without requiring that the original resource be synchronized with a duplicate of the original resource.

16. The method of claim 7, wherein the link to the original resource is created without uploading the original resource from the one of the computing device and the file share.

17. The method of claim 7, further comprising displaying one or more selectors on the Internet website configured to: open a resource explorer local to the computing device, wherein the resource explorer comprises one of a file explorer and a folder explorer; initiate storing in a data store an original location of the original resource and one or more of a name of the original resource, a type of the original resource, a size of the original resource, a creation date of the original resource, a last edited time of the original resource, a last edited date of the original resource, a last accessed time of the original resource, a last accessed date of the original resource, and an excerpt of one or more words within the original resource.

18. The method of claim 7, further comprising displaying one or more selectors on the Internet website that, when selected, are configured to allow searching for a location of, and opening locally, any file already residing on the computing device.

19. A computing and communication method, comprising:
providing one or more servers communicatively coupled with a computing device through a telecommunications network;
displaying one or more user interfaces on a display of the computing device, the one or more user interfaces displaying:
an Internet website provided by the one or more servers and accessed using an Internet browser; and
one or more selectors displayed on the Internet website; the one or more selectors configured to:
open a resource explorer local to the computing device, wherein the resource explorer comprises one of a file explorer and a folder explorer;
allow selection of an original resource using the resource explorer, wherein the original resource comprises one of a file and a folder, wherein the original resource already resides on one of the computing device and a file share that is mapped on the computing device; and
initiate storing, in a data store communicatively coupled with the one or more servers, an original location of the original resource and one or more of: a name of the original resource; a type of the original resource; a size of the original resource; a creation date of the original resource; a last edited time of the original resource; a last edited date of the original resource; a last accessed time of the original resource; a last accessed date of the original resource; and an excerpt of one or more words within the original resource.

20. A computing and communication system, comprising:
one or more servers communicatively coupled with a computing device through a telecommunications network;
one or more user interfaces displayed on a display of the computing device, the one or more user interfaces displaying:
an Internet website provided by the one or more servers and accessed using an Internet browser; and
one or more selectors displayed on the Internet website; the one or more selectors configured to:
open a resource explorer local to the computing device, wherein the resource explorer comprises one of a file explorer and a folder explorer;
allow selection of an original resource using the resource explorer, wherein the original resource comprises one of a file and a folder, wherein the original resource already resides on one of the computing device and a file share that is mapped on the computing device; and
initiate storing, in a data store communicatively coupled with the one or more servers, an original location of the original resource and one or more of: a name of the original resource; a type of the original resource; a size of the original resource; a creation date of the original resource; a last edited time of the original resource; a last edited date of the original resource; a last accessed time of the original resource; a last accessed date of the original resource; and an excerpt of one or more words within the original resource.

* * * * *

UNITED STATES PATENT AND TRADEMARK OFFICE
CERTIFICATE OF CORRECTION

| | | |
|---|---|---|
| PATENT NO. | : 11,856,045 B2 | Page 1 of 1 |
| APPLICATION NO. | : 16/948193 | |
| DATED | : December 26, 2023 | |
| INVENTOR(S) | : Brian Robert Lara | |

It is certified that error appears in the above-identified patent and that said Letters Patent is hereby corrected as shown below:

In the Specification

Column 10, Line 52, change "BLAS" to -BLAs-.

In the Claims

Column 17, Line 51, change "a file share by that" to -a file share that-.

Signed and Sealed this
Ninth Day of April, 2024

Katherine Kelly Vidal
*Director of the United States Patent and Trademark Office*